(12) United States Patent
Lele et al.

(10) Patent No.: US 8,401,109 B2
(45) Date of Patent: Mar. 19, 2013

(54) METHODS FOR SENDING AND RECEIVING A MULTICARRIER SIGNAL COMPRISING A PREAMBLE COMPRISING DATA ELEMENTS, CORRESPONDING DEVICES AND COMPUTER PRODUCTS

(75) Inventors: Chrislin Lele, Saint Jacques (FR); Jean-Philippe Javaudin, Rennes (FR); Alexandre Skrzypczak, Pacé (FR)

(73) Assignee: France Telecom, Paris (FR)

( * ) Notice: Subject to any disclaimer, the term of this patent is extended or adjusted under 35 U.S.C. 154(b) by 979 days.

(21) Appl. No.: 12/373,500

(22) PCT Filed: Jul. 12, 2007

(86) PCT No.: PCT/FR2007/051651
§ 371 (c)(1),
(2), (4) Date: May 14, 2009

(87) PCT Pub. No.: WO2008/007028
PCT Pub. Date: Jan. 17, 2008

(65) Prior Publication Data
US 2009/0257518 A1 Oct. 15, 2009

(30) Foreign Application Priority Data
Jul. 12, 2006 (FR) .................. 06 06370

(51) Int. Cl.
*H04K 1/10* (2006.01)
(52) U.S. Cl. ........ 375/295; 375/260; 375/262; 375/267; 375/340; 375/343; 375/146; 375/147; 375/149; 375/150

(58) Field of Classification Search .................. 375/260, 375/267, 346, 146, 147, 262, 340, 347; 370/203, 370/204, 205, 208, 209, 210
See application file for complete search history.

(56) References Cited

U.S. PATENT DOCUMENTS
5,852,630 A * 12/1998 Langberg et al. ............. 375/219
(Continued)

FOREIGN PATENT DOCUMENTS
EP 0734132 A2 3/1996
WO 0225883 A1 3/2002
(Continued)

OTHER PUBLICATIONS
International Search Report of foreign counterpart Application No. PCT/FR2007/051651 filed on Jul. 12, 2007.
(Continued)

*Primary Examiner* — Dhaval Patel
(74) *Attorney, Agent, or Firm* — David D. Brush; Westman, Champlin & Kelly, P.A.

(57) ABSTRACT

A method is provided for receiving a multicarrier signal formed by a temporal succession of symbols including of a set of data elements with real values, including informative data elements and pilots. Due to at least one preamble being inserted into the multicarrier signal and formed by at least two end symbols, encompassing at least one central symbol including of central pilots, such a reception method includes, for at least one central pilot, a step of eliminating or reducing an interference affecting the central pilot, and a step of estimating the transmission channel, taking into account the result of the eliminating or reducing step.

10 Claims, 3 Drawing Sheets

U.S. PATENT DOCUMENTS

| | | | |
|---|---|---|---|
| 7,242,720 B2 * | 7/2007 | Sugiyama et al. | 375/260 |
| 2004/0032909 A1 | 2/2004 | Gonzolez et al. | |
| 2004/0062191 A1 | 4/2004 | Lacroix-Penther et al. | |
| 2004/0246886 A1 * | 12/2004 | Mege et al. | 370/203 |
| 2008/0084817 A1 * | 4/2008 | Beckman et al. | 370/210 |

FOREIGN PATENT DOCUMENTS

| | | | |
|---|---|---|---|
| WO | 0225884 A1 | 3/2002 | |

OTHER PUBLICATIONS

French Search Report of foreign counterpart Application No. FR 06/06370 filed on Jul. 12, 2006.

International Preliminary Report on Patentability of foreign counterpart Application No. PCT/FR2007/051651 filed on Jul. 12, 2007.

* cited by examiner

METHODS FOR SENDING AND RECEIVING A MULTICARRIER SIGNAL COMPRISING A PREAMBLE COMPRISING DATA ELEMENTS, CORRESPONDING DEVICES AND COMPUTER PRODUCTS

CROSS-REFERENCE TO RELATED APPLICATIONS

This Application is a Section 371 National Stage Application of International Application No. PCT/FR2007/051651, filed Jul. 12, 2007 and published as WO 2008/007028 on Jan. 17, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the transmission and broadcasting of digital information, especially at high bit rates, on a limited frequency band.

More specifically, the disclosure pertains to a technique for sending and receiving a multicarrier signal through which an estimation of the transmission channel, for example in a radiomobile environment, can be obtained in reception.

The technique of the disclosure is particular well suited to the transmission of multicarrier signals that have undergone an OFDM/OQAM (Orthogonal Frequency Divisional Multiplexing/Offset Quadrature Amplitude Modulation) type of modulation or a BFDM/OQAM (Biorthogonal Frequency Division Multiplexing/OQAM) type modulation for which the carriers are shaped by a prototype function.

BACKGROUND OF THE DISCLOSURE

1. Multicarrier Modulations
1.1 OFDM Modulations

OFDM (Orthogonal Frequency Divisional Multiplex) type multicarrier modulations are known today. A modulation technique of this kind brings an efficient solution to the problem of the broadcasting information, especially for wired or wireless multiple-path channels.

Consequently, the OFDM multicarrier modulation technique has been chosen in several standards and specifications for applications in wired transmission, for example ADSL (Asymmetric Digital Subscriber Line) or PLC (Power Line Communication) or wireless transmission applications, for example systems of the DAB (Digital Audio Broadcasting), DVB-T (Digital Video Broadcasting-Terrestrial) or WLAN (Wireless Local Area Network) type.

However, the rectangular shaping of a signal made by an OFDM modulator has the drawback of poor frequency location.

Consequently, alternative solutions have been proposed, leading to the creation of multicarrier modulation systems in which the signal is shaped by functions known as prototype functions, enabling better frequency location to be obtained.

Indeed, the set of carriers of a multicarrier modulation forms a multiplex and each of the carriers of this multiplex can be shaped by means of a same prototype function, referenced g(t), which characterizes the multicarrier modulation.

1.2 OFDM/OQAM Modulations

Thus, one solution proposed consists in replacing a QAM (Quadrature Amplitude Modulation) implemented on each of the carriers by a modulation which offsets the real and imaginary parts of the complex symbols to be transmitted by a half symbol time, for two successive carrier frequencies.

This alternation leads to an OFDM/OQAM type multicarrier modulation. This approach makes it possible especially to obtain the desired conditions of orthogonality with prototype filters that are not necessarily rectangular in shape.

Indeed, the temporal offset introduced by OQAM modulation relaxes the constraints of orthogonality and more generally those of biorthogonality. This class of modulation thus offers a wider choice of prototype functions than the simple rectangular prototype function of an OFDM modulation.

Thus, depending on the type of transmission channel considered for a given application, for example the radiomobile or powerline communication (PLC) channel, it is possible to choose prototype functions appropriate to the types of distortion encountered. In particular, it is preferable to choose prototype functions showing higher frequency selectivity than the cardinal sine used in OFDM modulation, especially in radiomobile channels, to overcome the frequency dispersion due to the Doppler effect or in a PLC channel to withstand narrow-band noise phenomena with greater efficiency and generally to meet the frequency specifications of transmission masks with greater ease.

OFDM/OQAM modulation is therefore an alternative to classic OFDM modulation, relying on a judicious choice of the prototype function modulating each of the carriers of the signal which need to be well located in the time/frequency space.

In particular, FIG. 1 illustrates a time/frequency representation of the real-value data elements transmitted by OFDM/OQAM modulation and of the complex-value data elements transmitted by classic OFDM modulation without any guard interval, an OFDM/QAM complex value symbol or OFDM/OQAM real value symbol being formed by a set of data elements at a given point in time t. Furthermore, each time/frequency location bears a carrier frequency, called a sub-carrier or directly a carrier here below in the description.

In this FIG. 1, the triangles at a given point in time t represent the complex-value data elements of an OFDM/QAM symbol. The circles and asterisks shown at a given point in time t for their part represent the real-value data elements of an OFDM/OQAM symbol. For example, for two successive real-value OFDM/OQAM symbols, the circles correspond to the real part and the asterisks to the imaginary part of a complex symbol coming from a QAM constellation which it is sought to transmit by using an OFDM/OQAM modulation.

Indeed, for a complex type of classic OFDM modulation, the real and imaginary parts of a complex value coming from the QAM constellation are transmitted simultaneously, at intervals of every symbol time period $T_u$; however, in a real type of OFDM/OQAM modulation, the real and imaginary parts are transmitted with a temporal offset of one complex half symbol time ($T_u/2$).

It can be seen in FIG. 1 that the spectral efficiency of the OFDM/OQAM is identical to that of classic OFDM without any guard interval. Indeed, if $v_0$ denotes the spacing between two adjacent carriers of the multiplex and $\tau_0$ denotes the temporal spacing between two real-value symbols, the following are transmitted for a same inter-carrier spacing $v_0$:

in OFDM/OQAM, one real value per carrier at every time slot $\tau_0$;

in classic OFDM without guard interval, one complex value (i.e. two real values) every $2\times\tau_0 = T_u$.

In other words, the spectral efficiency of OFDM/OQAM is $(T_g + 2\tau_0)/2\tau_0$ times greater than that of classic OFDM with a guard interval of a duration $T_g$.

1.3 BFDM/OQAM Modulation

Furthermore, if we choose to have demodulation functions on the reception side that are not necessarily the conjugate functions of the prototype functions used in transmission, it is possible by using the property of biorthogonality, to generalize OFDM/OQAM to the BFDM/OQAM modulation technique.

The offset principle, related to the OQAM family is strictly identical in the context of a BFDM/OQAM type modulation. Consequently, FIG. 1 can also be applied to BFDM/OQAM type modulations.

More specifically, the value of BFDM/OQAM type modulation is that, for a given length of prototype filter, it enables a reduction in the delay due to the transmission system.

As indicated here above, the BFDM/OQAM modulation technique, just like the OFDM/OQAM modulation technique, transmits real-valued symbols at a rate that is twice the rate at which the OFDM transmits complex-value symbols. Consequently, these two modulations have in principle the same spectral efficiency.

More specifically, the BFDM/OQAM signal can be represented in baseband in the following form:

$$s(t) = \sum_n \sum_{m=0}^{M-1} a_{m,n} \underbrace{g(t-n\tau_0)e^{j2\pi m v_0 t}e^{j\phi_{m,n}}}_{g_{m,n}(t)}, \quad (1)$$

with:

$a_{m,n}$ the real data elements to be transmitted on a carrier m at the instant n;

M the number of carrier frequencies (necessarily an even number);

g the prototype function used by the modulator;

$\tau_0$ the duration of a BFDM/OQAM symbol;

$v_0$ the inter-carrier spacing;

$\phi_{m,n}$ is a phase term chosen so as to obtain a real part/imaginary part alternation enabling the orthogonality or more generally biorthogonality to be obtained.

Indeed, in the biorthogonal case, the demodulation base at reception may be different from that of transmission, and can be expressed in the following form:

$$f_{m,n}(t) = f(t-n\tau_0)e^{j2\pi m v_0 t}e^{j\phi_{m,n}} \quad (2)$$

The condition of biorthogonality can then be expressed in the following form:

$$\langle g_{m,n}, f_{m',n'} \rangle_R = \Re\left\{\int_{-\infty}^{\infty} g_{m,n}(t) f_{m',n'}^*(t) dt\right\} = \delta_{m,m'}\delta_{n,n'} \quad (3)$$

where: $\langle .,. \rangle_R$ designates the real scalar product and $\Re\{\}$ designates the real part.

However, one drawback of BFDM/OQAM (or OFDM/OQAM) type modulation techniques is that the condition of biorthogonality (or orthogonality) is obtained only for real values of symbols to be transmitted. This raises a problem of estimation at reception, and especially of estimation of the transmission channel, in as much as the symbols received are complex symbols.

2. The Transmission Channel

Here below, a brief description is given of the characteristics of a transmission channel, especially in a radiomobile environment, and of the techniques of estimation of such a channel. It may be recalled indeed that the method for shaping an electrical signal from the information to be transmitted depends on the conditions in which such a signal is transmitted.

2.1 Characteristics of the Transmission Channel

In a radiomobile environment, the transmitted wave, in its journey, undergoes numerous reflections and the receiver therefore receives a sum of delayed versions of the sent signal. Each of these versions is attenuated and phase shifted randomly. This phenomenon known as "delay spread" generates inter-symbol interference (ISI). The term ISI is understood to mean especially interference between temporal symbols and/or between carriers. For example, in an urban type of environment, the delay spread is in the range of some microseconds or less.

Since the receiver (for example a motorist's mobile radio telephone) is assumed to be moving, the effect known as the Doppler effect also acts on each path, resulting in a shift in the frequency of the received spectrum that is proportional to the speed of movement of the mobile.

The combined action of these effects is expressed in the form of a non-stationary channel having profound fading effects at certain frequencies. A channel of this kind is qualified especially as a frequency-selective channel. In certain applications, which are particularly worthwhile in the context of the present invention, the transmission band has a width greater than that of the coherent band of the channel (i.e. the band for which the frequency response of the channel may be considered to be constant over a given period of time). Fading phenomena therefore appear in the band, i.e. at a given point in time, certain frequencies are highly attenuated.

To overcome these different phenomena (due to the ISI and to the Doppler effect), it has been envisaged in OFDM type systems to add a guard interval during which no payload information is transmitted so as to ensure that all the pieces of information received come from a same symbol. In the case of a consistent demodulation of sub-carriers, the distortion given by the channel is then corrected by estimating its value at every point of the time/frequency network.

The introduction of a guard interval of this kind thus reduces the phenomena related to inter-symbol interference.

However, one major drawback of this technique is that its spectral efficiency is limited since no payload information is transmitted during the guard interval.

On the other hand, OFDM/OQAM and BFDM/OQAM type modulation techniques do not necessitate the introduction of a guard interval or a cyclic prefix, while at the same time having the same spectral efficiency as classic OFDM modulation.

2.2 Estimation of the Transmission Channel

The distinct features of real type multicarrier modulations on the one hand and complex type multicarrier modulations on the other hand give rise to different types of processing when an estimation of the transmission channel is performed.

In the OFDM/OQAM context, a method has been envisaged in particular relying on the implementation of an estimation by reference symbols. In this technique, at least one reference symbol is placed at the start of a frame, a frame being constituted by a set of at least one reference symbol, called a preamble, and a set of payload symbols. Using these symbols or this symbol, the channel is estimated on each of the carriers of the multiplex. The choice of the parameters of the system (symbol duration, frame length etc) ensures that the channel will vary slowly relative to the symbol time. It is then assumed to be quasi-constant on a frame. It is possible therefore to choose the estimate of the channel on the reference symbols for all the OFDM symbols of the frame.

Indeed, to estimate the complex gain of the channel on a given sub-carrier, it would be appropriate to carry out the complex projection of the received signal on the sub-carrier considered. Now, the orthogonality of the translated values in the real sense and the fact that the prototype functions, even those chosen to be localized to the utmost extent in time and in frequency, have an infinite support on at least one of the two axes namely the time axis or the frequency axis, implying that even on an ideal channel, (intrinsic) inter-carrier interference will be generated.

Indeed, the imaginary part of the projection of the signal received on the base of the translated values of the prototype function is not 0. A disturbance-causing term then appears and gets added to the demodulated signal, and has to be corrected before the channel estimation is done. It is therefore necessary to design methods to compensate for this loss of complex orthogonality and thus mitigate at least some of the drawbacks of this prior-art technique for OFDM/OQAM or BFDM/OQAM type modulations.

Let us consider for example y(t) the signal received.

It is assumed especially that the choice of the parameters of the multicarrier modulation ensures that the channel may be considered to be flat on each of the sub-carriers for each OFDM/OQAM symbol. The channel can then be modeled by one complex coefficient per sub-carrier denoted $H_{m,n}$, where m is the index of the sub-carrier and n is the index of the OFDM/OQAM symbol.

We then use the complex projection of the multicarrier signal at the point $(m_0, n_0)$ of the time/frequency space to estimate the transmission channel $\hat{H}_{m_0,n_0}$ at this location.

Thus, if we send $a_{m_0,n_0} = \sqrt{E}$ at this location, we have:

$$\hat{H}_{m_0,n_0} = \frac{\int y(t) g^*_{m_0,n_0}(t) dt}{\sqrt{E}} \quad (4)$$

Assuming that the channel is ideal (y(t)=s(t)), given that the OFDM/OQAM and BFDM/OQAM modulations have only real orthogonality (equation (3)), we cannot have $\hat{H}_{m_0,n_0} = 1$.

Therefore, taking $a_{m_0,n_0}^{(c)} = \langle s, g_{m_0,n_0} \rangle_C = \int s(t) g_{m_0,n_0}(t) dt$, and assuming that the channel is ideal, we have:

$$a_{m_0,n_0}^{(c)} = \sqrt{E} + \underbrace{\sum_{(m,n) \neq (m_0,n_0)} a_{m,n} \int g_{m,n}(t) g^*_{m_0,n_0}(t) dt}_{I_{m_0,n_0} \in jR} \quad (5)$$

where $\langle .,. \rangle_C$ designates the complex scalar product.

The equation (5) expresses the fact that the complex projection of the perfectly transmitted signal is nevertheless affected by an inter-symbol interference (ISI) intrinsic to the OFDM/OQAM and BFDM/OQAM modulations denoted as $I_{m_0,n_0}$.

In particular, the existence of this inter-symbol interference greatly disturbs the estimation of the transmission channel and therefore the estimation of the symbols.

One solution to this problem has been proposed especially in the patent document WO 02/25884 published on 28 Mar. 2002 in the context of a channel estimation by reference symbols for a multicarrier signal comprising at least one frame.

More specifically, the technique proposed in this document enables this interference to be limited by using a specific framing of the data at sending, relying on the insertion of a preamble. Thus, the intrinsic interference affecting the reference symbols of the frames of the multicarrier signal is reduced by dictating a constraint on the value of at least one of the data elements of the reference symbols.

Thus, this technique associates a reference data element called a pilot as well as a piece of control data with 3×3 zones of the time/frequency network, called first-ring zones or greater-sized zones.

However, one drawback of this technique relying on the insertion of the preamble is the loss of spectral efficiency related to the sending of the preamble, this preamble being classically formed by at least three reference symbols, during which no payload information is transmitted.

Another drawback of this prior-art technique is that the sequences used to reduce the intrinsic interference have a periodic character leading to a very high variation in the dynamic range of the multicarrier signal, and for example in the power average peak ratio (PAPR) on the preambles.

Furthermore, this technique is limited to certain types of prototype filters and/or types of modulations.

Another drawback of this prior-art technique is that it calls for a matrix computation at sending and at reception, with a matrix size that increases with the size of the ring.

There is therefore a need for a technique providing for a better estimation of the transmission channel and giving a more precise estimation of the informative data elements carried by the multicarrier signal.

SUMMARY

An aspect of the disclosure relates to a method for receiving a received signal corresponding to a multicarrier signal sent by at least one sender device through a transmission channel, said multicarrier signal being formed by a temporal succession of symbols formed by a set of data elements comprising:
  informative data elements, and
  for at least certain of said symbols, reference data elements, called pilots, whose value and location at transmission are known to at least one receiver designed to make a reception of said multicarrier signal,
each of said data elements modulating a carrier frequency of said signal, a carrier frequency modulated by one of said data elements being called a carrier.

According to an embodiment of the invention, at least one preamble formed by at least three consecutive symbols and designed to enable an estimation of said transmission channel being inserted into said multicarrier signal, said preamble symbols comprise at least two end symbols framing at least one central symbol formed by pilots, called central pilots, such that said end symbols carry, on at least some of their carriers neighbouring a central pilot, data elements organised into at least one group of elements, the data elements of at least one group of elements being informative data elements, said reception method comprises, for at least one central pilot:
  a step for cancelling or reducing an interference affecting said central pilot, taking account of a relationship of proportionality linking the real values carried by each element of said group of elements;

a step for estimating said transmission channel, taking account of the result of said cancellation or reduction step.

Thus, an embodiment of the invention relies on a novel and inventive approach to the estimation of the transmission channel in a transmission system implementing a multicarrier signal bearing real-value data elements and comprising a preamble which may be formed not only by reference data elements alone but also by informative data elements. In particular, a multicarrier signal of this kind is of the OFDM/OQAM or BFDM/OQAM type.

It may be recalled that this transmission channel is subdivided into cells along the time and frequency axes. Each cell or location of the time/frequency space is assigned a dedicated carrier. Then, the information to be transported is divided among all these carriers.

More specifically, the technique of an embodiment of the invention relies on a cancellation or reduction, at reception, of an interference affecting a central pilot, in taking account of a relationship of proportionality linking the real values carried by each element of a group of elements, a group of elements of this kind being constituted by data elements carried by some of the carriers that are neighbours of the central pilot on the end symbols.

In particular, the end symbols and therefore the groups of elements carry informative data elements and/or reference data elements.

Thus, on the basis of the relationship of proportionality linking the real values in transmission or the data elements neighbouring a central pilot, an imaginary interference affecting this central pilot is cancelled or reduced. At reception, we then use the result of the cancellation or reduction of this imaginary interference term to determine an estimation of the transmission channel between a sender and a receiver of said multicarrier signal.

In particular, contrary to the prior-art techniques in which the preamble is formed by at least three reference symbols, the technique of an embodiment of the invention introduces informative data elements into the preamble and therefore increases the number of useful symbols.

It can also be noted that this technique can be applied to different types of prototype functions which are not necessarily isotropic.

According to one variant of an embodiment of the invention, said transmission channel is roughly constant on at least two consecutive frequencies demarcating a region of interest, the step for cancellation or reduction of the imaginary interference affecting said central pilots implements a linear combination in frequency of the central pilots located in said region of interest.

Thus, if we consider a channel that can be modelled by a complex coefficient by sub-carrier $H_{m,n}$, where m is the index of the sub-carrier and n that of a central symbol, and roughly non-variant in frequency at the locations (m,n) and (m+1,n), then we have:

$$H_{m,n}^{(c)} \approx H_{m+1,n}^{(c)}$$

Consequently, the linear combination in frequency implemented to cancel or reduce the interference affecting a central pilot of the central symbol n can be expressed in the following form:

$$t_1 y_{m,n}^{(c)} + t_2 y_{m+1,n}^{(c)} = H_{m,n}^{(c)}(t_1 a_{m,n}^{(r)} + t_2 a_{m+1,n}^{(r)} + j(t_1 a_{m,n}^{(i)} + t_2 a_{m+1,n}^{(i)})),$$

with:

$y_{m,n}^{(c)}$ the (complex) signal received at the location (m,n);
$y_{m+1,n}^{(c)}$ the (complex) signal received at the location (m+1,n);
$H_{m,n}^{(c)}$ the complex coefficient representing the transmission channel at the location (m,n), such that $H_{m,n}^{(c)} \approx H_{m+1,n}^{(c)}$;
$a_{m,n}^{(r)}$ and $a_{m,n}^{(i)}$ being real values respectively equal to the real part and to the imaginary part of the value of a central pilot at the location (m,n);
$a_{m+1,n}^{(r)}$ and $a_{m+1,n}^{(i)}$ are real values equal respectively to the real part and to the imaginary part of the value of a central pilot at the location (m+1,n);
$t_1$ and $t_2$ are coefficients such that $t_1 a_{m,n}^{(i)} + t_2 a_{m+1,n}^{(i)} = 0$.

According to another alternative embodiment of the invention, said transmission channel being roughly constant on at least two consecutive instants forming a region of interest, and said preamble comprising at least two central symbols, said step of cancellation or reduction of imaginary interference affecting said central pilots implements a linear combination in time of said central pilots located in said region of interest.

Thus, we consider a channel that can be modelled by a complex coefficient by sub-carrier $H_{m,n}$, where m is the index of the sub-carrier and n is that of a central symbol, substantially non-variant in time at the locations (m,n) and (m,n+1). We therefore have $H_{m,n}^{(c)} \approx H_{m,n+1}^{(c)}$.

More specifically, we consider a preamble comprising for example four symbols, including two central symbols at the temporal indices n and n+1.

Consequently, the linear combination in time implemented to cancel or reduce the interference affecting a central pilot of the central symbol n or of the central symbol n+1 can be expressed in the following form:

$$t_1 y_{m,n}^{(c)} + t_2 y_{m,n+1}^{(c)} = H_{m,n}^{(c)}(t_1 a_{m,n}^{(r)} + t_2 a_{m,n+1}^{(r)} + j(t_1 a_{m,n}^{(i)} + t_2 a_{m,n+1}^{(i)}))$$

with:

$y_{m,n}^{(c)}$ the (complex) signal received at the location (m,n);
$y_{m+1,n}^{(c)}$ the (complex) signal received at the location (m+1,n);
$H_{m,n}^{(c)}$ the complex coefficient representing the transmission channel at the location (m,n), such that $H_{m,n}^{(c)} \approx H_{m+1,n}^{(c)}$;
$a_{m,n}^{(r)}$ and $a_{m,n}^{(i)}$ des valeurs réelles égales respectivement à la partie réelle et à la partie imaginaire de la valeur d'un pilote central à l'emplacement (m,n);
$a_{m+1,n}^{(r)}$ et $a_{m+1,n}^{(i)}$ are real values equal respectively to the real part and to the imaginary part of the value of a central pilot at the location (m+1,n);
$t_1$ and $t_2$ are coefficients such that $t_1 a_{m,n}^{(i)} + t_2 a_{m+1,n}^{(i)} = 0$.

Another embodiment of the invention concerns a device for receiving a received signal corresponding to a multicarrier signal, as described here above, sent out by at least one sender device through a transmission channel.

According to an embodiment of the invention, at least one preamble formed by at least three consecutive symbols and designed to enable an estimation of said transmission channel being inserted into said multicarrier signal, said preamble symbols comprising at least two end symbols framing at least one central symbol formed by pilots, called central pilots, such that said end symbols carry, at least on certain of their neighbouring carriers of a central pilot, data elements organised into at least one group of elements, the data elements of at least one group of elements being informative data elements, said reception device comprises for at least one central pilot:

means for cancelling or reducing an interference affecting said central pilot, taking account of a relationship of proportionality linking the real values carried by each element of said group of elements;

means for estimating said transmission channel, taking account of the result of said cancellation or reduction step.

A receiving device of this kind is adapted especially to implementing the method for receiving as described here above.

For example, a receiving device of this kind corresponds to or is included in a terminal (radio telephone, laptop, PDA etc) or in a base station.

Another aspect of the invention concerns a computer program product downloadable from a communications network and/or recorded in a computer-readable medium and/or executable by a processor comprising program code instructions for the implementation of the method for receiving as described here above.

Another aspect of the invention concerns a method for sending a multicarrier signal, intended for transmission via a transmission channel, formed by a temporal succession of symbols formed by a set of real-value data elements comprising:

informative data elements, and for at least certain of said symbols, reference data elements called pilots whose value and location at transmission are known to at least one receiver designed to make a reception of said multicarrier signal, each of said data elements modulating a carrier frequency of said signal, a carrier frequency modulated by one of said data elements being called a carrier.

According to an embodiment of the invention, such a sending method inserts into said multicarrier signal at least one preamble formed by at least three consecutive symbols, said preamble symbols comprising at least two end symbols framing at least one central symbol formed by pilots, called central pilots, such that said end symbols carry, on at least some of their carriers neighbouring a central pilot, data elements organised into at least one group of elements, the values between each element of a group of elements being linked by a relationship of proportionality, making it possible to cancel or reduce, at reception, an interference affecting said central pilot, the data elements of at least one group of elements being informative data elements. Such a preamble thus makes it possible to determine an estimation of a transmission channel between a sender designed to send said multicarrier signal and said receiver.

Thus, contrary to the prior-art techniques in which the preamble is integrally formed by reference data elements, the technique of an embodiment of the invention proposes to introduce informative data elements into the preamble, on the end symbols. Thus, loss of spectral efficiency is avoided by introducing data into the preamble.

For example, said groups of elements each comprise four informative data elements, each data element of a same group of elements bearing an identical value in terms of absolute value.

According to a particular aspect of the invention, the central pilots of said central symbol or symbols bear an identical value.

According to one variant of an embodiment, said data elements of at least one group of elements are pilots, making it possible to obtain a better estimation of the transmission channel.

Another embodiment of the invention also concerns a device for sending a multicarrier signal as described here above.

According to an embodiment of the invention, such a device comprises means for the insertion into said multicarrier signal of at least one preamble formed by at least three consecutive symbols, said preamble symbols comprising at least two end symbols framing at least one central symbol formed by pilots, called central pilots, such that said end symbols carry, on at least some of their carriers neighbouring a central pilot, data elements organised into at least one group of elements, the values between each element of a group of elements being linked by a relationship of proportionality, making it possible to cancel or reduce, at reception, an interference affecting said central pilot, the data elements of at least one group of elements being informative data elements so that said preamble makes it possible to determine an estimation of said transmission channel.

Such a sending device is especially suited to implementing the sending method described here above.

In particular, it is adapted to sending such a multicarrier signal to the reception device described here above.

For example, a sending device of this kind corresponds to or is included in a terminal (radio telephone, laptop, PDA etc) or in a base station.

Another aspect of the invention concerns a computer program product downloadable from a communications network and/or recorded in a computer-readable medium and/or executable by a processor comprising program code instructions for the implementation of the sending method as described here above.

Another aspect of the invention pertains to a multicarrier signal formed by a temporal succession of symbols formed by a set of real-value data elements comprising informative data elements, and for at least certain of said symbols, reference data elements called pilots for which the value and location at transmission are known to at least one receiver designed to perform a reception of said multicarrier signal, each of said data elements modulating a carrier frequency of said signal, a modulated carrier frequency modulated by one of said data elements being called a carrier.

According an embodiment of the invention, such a signal comprises at least one preamble formed by at least three consecutive symbols, said preamble symbols comprising at least two end symbols framing at least one central symbol formed by pilots, called central pilots, such that said end symbols carry, on at least some of their carriers neighbouring a central pilot, data elements organised into at least one group of elements, the values between each element of a group of elements being linked by a relationship of proportionality, making it possible to cancel or reduce, at reception, an interference affecting said central pilot, the data elements of at least one group of elements being informative data elements. The preamble thus makes it possible to determine an estimation of a transmission channel between a sender designed to send said multicarrier signal and said receiver.

Such a signal can be sent especially according to the sending method described here above and/or received according to the reception method described here above. This signal could of course comprise the different characteristics pertaining to the sending method according to an embodiment of the invention.

BRIEF DESCRIPTION OF THE DRAWINGS

Other features and advantages shall appear more clearly from the following description of a preferred embodiment, given by way of a simple non-exhaustive and illustrative example, and from the appended drawings, of which.

DETAILED DESCRIPTION OF ILLUSTRATIVE EMBODIMENTS

1. Description of one Embodiment of the Invention

The general principle of an embodiment of the invention relies on the implementation, in a multicarrier signal, of at least one preamble formed by symbols known as preamble symbols, at least one symbol of which comprises reference data elements (also called pilots) known to a receiver designed to perform a reception of this multicarrier symbol.

More specifically, according to one particular embodiment, a preamble is formed by at least three reference symbols, at least one central symbol of which formed by pilots known as central pilots and two end symbols bearing, at least in certain carriers neighbouring a central pilot, data elements organised into groups of elements. In other words, a preamble of this kind has a duration of at least $3\tau_0$, with $\tau_0$ being the duration of a symbol.

In particular, a group of elements of this kind surrounding a central pilot comprises data elements whose real values are linked by a relationship of proportionality known to the receiver.

This relationship of proportionality is thus taken into account at the cancellation or reduction of an imaginary interference affecting said central pilot at reception.

At reception, the result of the cancellation or reduction of an imaginary interference affecting said central pilot is then used to determine an estimation of the transmission channel between a sender and a receiver of said multicarrier signal.

Here below, we describe a particular embodiment of the invention implemented in the context of a multicarrier OFDM/OQAM or BFDM/OQAM type modulation.

On the sending side, at least one preamble formed by at least three consecutive symbols comprising at least two end symbols framing at least one central symbol is inserted into the multicarrier signal.

As indicated here above, the elements of a group of elements framing a central pilot carry values linked by a relationship of proportionality known to the receiver.

In particular, such a preamble by which an estimation of the transmission channel can be determined on all the frequencies, it being assumed that the channel is constant in time, can especially be inserted periodically.

Here below, referring to FIG. 2A, a first exemplary embodiment of the invention is presented wherein a preamble of this kind is used to reduce or cancel the imaginary interference affecting a central pilot after the implementation at reception of a linear combination of the frequency-adjacent signals.

Figure 1:
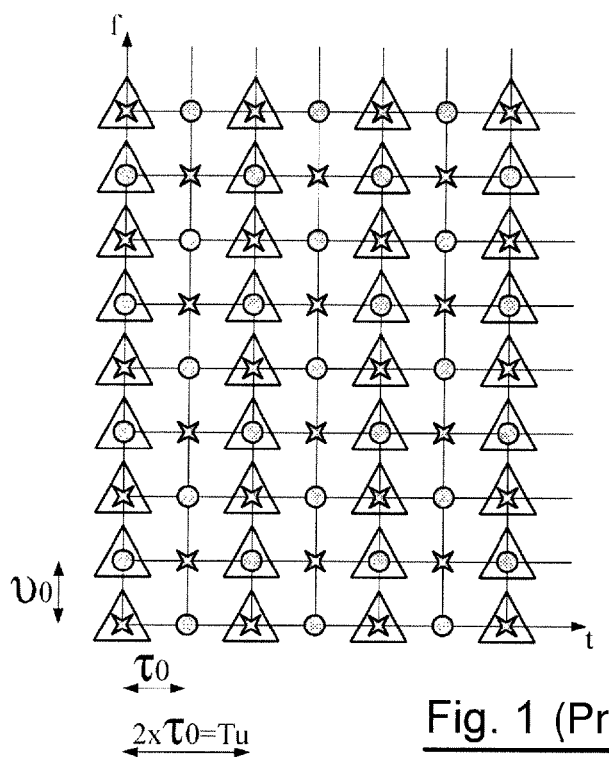
FIG. 1, already commented upon with reference to the prior art, is a time/frequency representation of the complex-value symbols transmitted according to a classic OFDM modulation and real-value symbols transmitted according to a prior art OFDM/OQAM modulation.
Figure 2A:
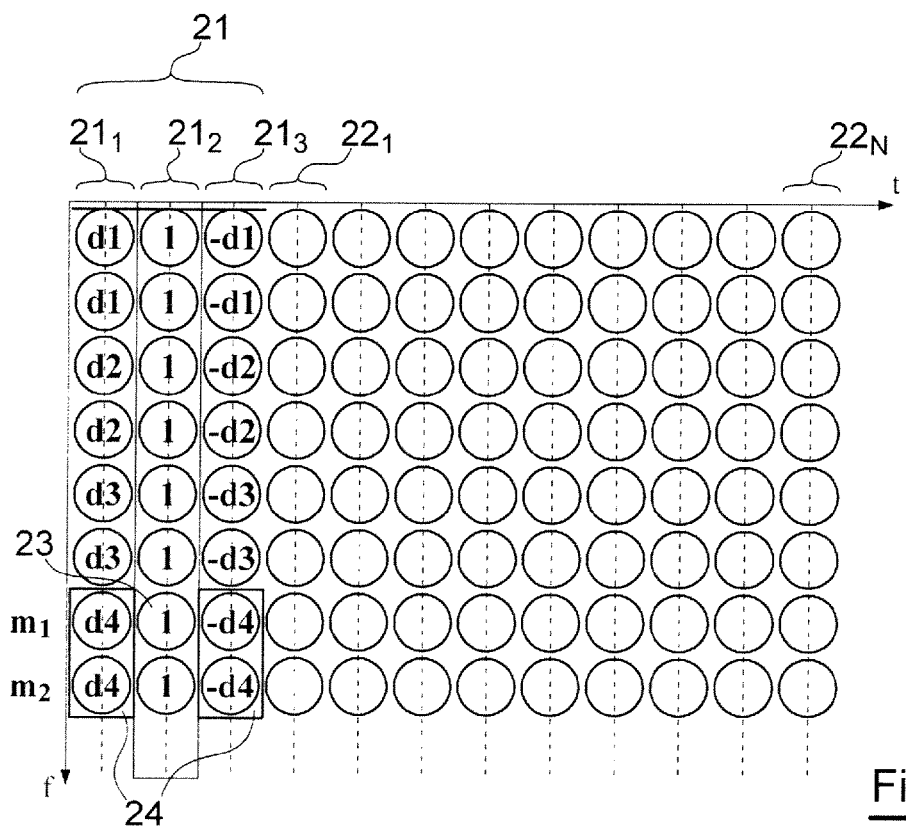
FIGS. 2A and 2B illustrate examples of a structure of a multicarrier signal according to two embodiments of the invention.

More specifically, FIG. 2A illustrates a multicarrier signal formed by a temporal succession of symbols constituted by a set of data elements comprising:
  informative data elements, and
  for at least certain of said symbols, reference data elements, called pilots, whose value and location at transmission are known to at least one receiver designed to make a reception of said multicarrier signal, A multicarrier signal of this kind has a preamble 21 and a set of payload symbols $22_1$ to $22_N$.

For example, the preamble 21 comprises three symbols $21_1$, $21_2$ and $21_3$, also called preamble symbols, including a first end symbol $21_1$, a central symbol $21_2$ and a second end symbol $21_3$, the central symbol $21_2$ bearing reference data elements denoted as central pilots.

In FIG. 2A, a central pilot 23 is framed by a group of elements 24 whose real values carried in sending mode are linked by a relationship of proportionality.

For example, the group of elements 24 comprises the informative data elements d4, d4, −d4 and −d4. More specifically, for example for the end symbol $21_1$, the data elements on two consecutive frequencies $m_1$ and $m_2$ of the group 24 are equal and carry the data element d4, and for the end symbol $21_3$, the data elements at the two consecutive frequencies $m_1$ and $m_2$ of the group 24 are equal and carry the data element −d4.

In other words, for a same frequency $m_1$ or $m_2$, the data elements of the group 24 on the two end symbols framing the central pilot 23, are d4 and −d4.

Here below referring to FIG. 2B, we present a second example of an embodiment of the invention in which a preamble of this kind is used to reduce or cancel the imaginary interference affecting a central pilot after the implementation at reception of a linear combination of the temporarily adjacent signals.

Figure 2B:
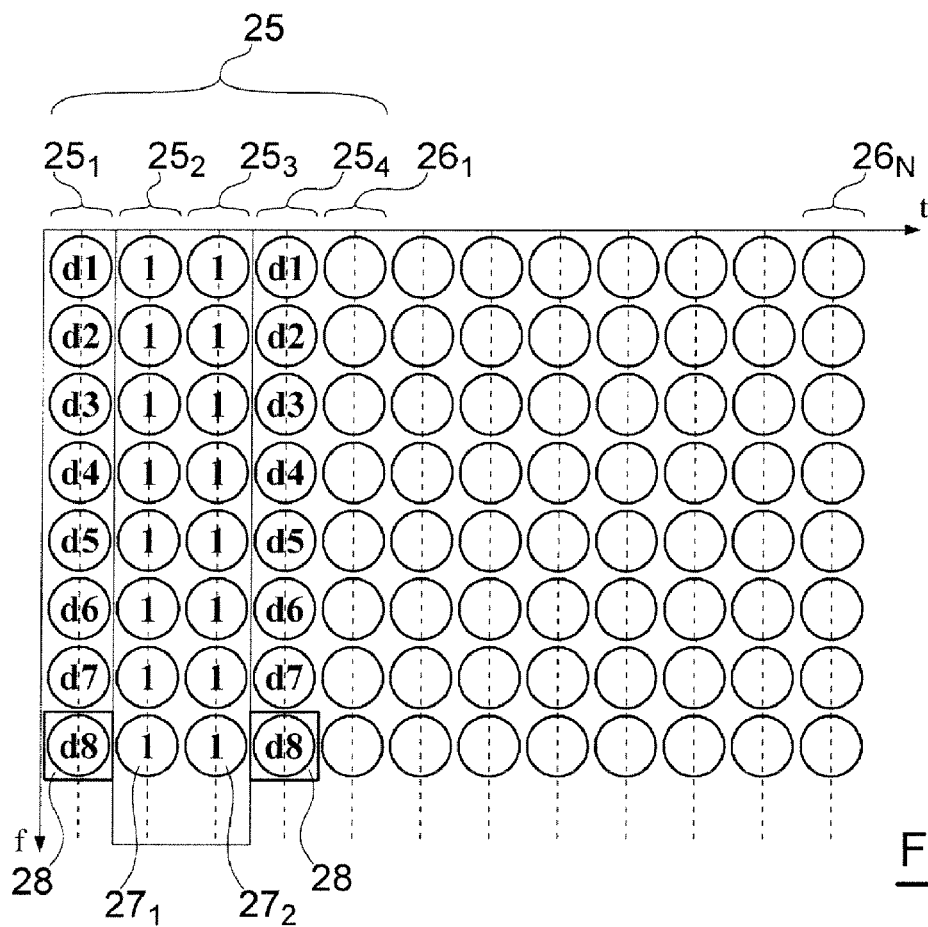

More specifically, FIG. 2B illustrates a multicarrier signal formed by a temporal succession of symbols constituted by a set of real-value data elements.

A multicarrier signal of this kind has a preamble 25 and a set of payload symbols $26_1$ to $26_N$.

For example, the preamble 25 has four symbols $25_1$, $25_2$, $25_3$ and $25_4$ also called preamble symbols, including a first end symbol $25_1$, two central symbols $25_2$ and $25_3$ and a second end symbol $25_4$, the central symbols $25_2$ and $25_3$ carrying central pilots.

FIG. 2B shows two central pilots $27_1$ and $27_2$ framed by a group of elements 28 for which the real values carried in sending mode are linked by a relationship of proportionality.

For example, the data elements of the group 28 of a same frequency are equal and carry a data element equal to d8 for the two end symbols $25_1$ and $25_4$ framing the two centre pilots $27_1$ and $27_2$.

Figure 3:
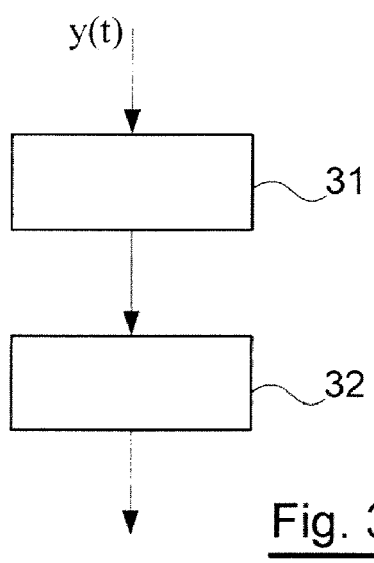
FIG. 3 presents the main steps of the receiving method according to one embodiment of the invention.

On the reception side, as illustrated with reference to FIG. 3, a step 31 is used to cancel or reduce the imaginary interference affecting a central pilot by implementing an appropriate linear combination between at least two frequencies and/or two consecutive times.

Should the channel be considered to be roughly constant in frequency, the preamble implemented at transmission is for example the one illustrated in FIG. 2A.

Thus, the linear combination made at reception at the step 31 is applied for two successive frequencies for example $m_1$ and $m_2$, with $m_1=m$ and $m_2=m+1$.

For example, if the central pilot 23 is located at the time/frequency location (m,n) and carries a real value $a_{m,n}$ at transmission, denoted $a_{m,n}^{(r)}$, then the received signal $y_{m,n}$ at reception at the location (m,n) carries a complex value denoted $y_{m,n}^{(c)}$. Similarly, for the central pilot located at the time/frequency location (m+1,n) and carrying a real value $a_{m+1,n}$ at transmission, denoted $a_{m+1,n}^{(r)}$, the received signal $y_{m+1,n}$ at reception at the location (m+1,n) carries a complex value denoted $y_{m+1,n}^{(c)}$.

The linear combination in this example is applied to $y_{m,n}^{(c)}$ and $y_{m+1,n}^{(c)}$ so as to cancel or to reduce the imaginary interference affecting the pilot 23 located at the time/frequency location (m,n) and/or the pilot located at the time/frequency location (m+1,n).

The estimation of the channel is then obtained in a step 32 by division with the same linear combination of the signals received at the time/frequency locations (m,n) and (m+1,n).

These different steps are implemented for all the central pilots of the central symbol $21_2$ except for the central pilots carried by the frequencies limiting the multicarrier signal, the values of the data elements carried by the frequencies on the border of the spectrum being classically set at zero.

Here below, we describe two exemplary implementations of the receiving technique according to this particular embodiment of the invention, in the context of a BFDM/OQAM type modulation.

More specifically, the received signal y(t) can be written in the form:

$$y(t) = \sum_{n} \sum_{m=0}^{M-1} H_{m,n}^{(c)} a_{m,n} g_{m,n}(t) + b(t), \quad (6)$$

with $H_{m,n}^{(c)}$ being the coefficients representing the transmission channel at each time/frequency location with m being the frequency index and n being the temporal index, and b(t) being the noise component.

As already specified for the OFDM/OQAM type modulations, the sent signal and the transmission channel being modelled in baseband by complex numbers the value $a_{m_0,n_0}^{(c)}$ to be estimated at reception for each location $(m_0,n_0)$ of the time/frequency network is also a complex number.

Assuming also that the channel is approximately constant on a given region of the time/space frequency, owing to the biorthogonality of the pair of functions (f,g) described with reference to the equation (3), the signal received at the carrier $m_0$ at the instant $n_0$ is estimated by:

$$y_{m_0,n_0}^{(c)} = \langle s, f_{m_0,n_0} \rangle_C \quad (7)$$

$$y_{m_0,n_0}^{(c)} = H_{m_0,n_0}^{(c)} a_{m_0,n_0} +$$

$$H_{m_0,n_0}^{(c)} \underbrace{\left[ \sum_{(m,n) \neq (m_0,n_0)} a_{m,n} \int g_{m,n}(t) f_{m_0,n_0}^*(t) dt \right]}_{C_{m_0,n_0}} + D_{m_0,n_0} + b_{m_0,n_0}$$

In this expression, the term $C_{m_0,n_0}$ is linked to the interference created in the region where the transmission channel is assumed to be constant, and the term $D_{m_0,n_0}$ is associated with the interference created in the regions where the transmission channel is no longer assumed to be constant.

Here below in the description, we omit the noise component b and overlook the term $D_{m_0,n_0}$ so as to simplify the equations.

Thus, in the first example, the channel is considered to be roughly non-variant in frequency at the locations (m,n) and (m+1,n) and to be capable of being modelled by a complex coefficient by sub-carrier $H_{m,n}$, where m is the index of the sub-carrier and n is the index of the central symbols, and then we get:

$$H_{m,n}^{(c)} \approx H_{m+1,n}^{(c)}$$

The received signal at any location (m,n) of the time/frequency network can be interpreted as the result of the product of a complex channel multiplied by a complex value, i.e.:

$$y_{m,n}^{(c)} = H_{m,n}^{(c)} a_{m,n}^{(c)} = H_{m,n}^{(c)} (a_{m,n}^{(r)} + j a_{m,n}^{(i)}), \quad \text{where}$$
$a_{m,n}^{(r)}$ and $a_{m,n}^{(i)}$ are real values (the exponent (r) indicates the real part of a complex value and the exponent (i) indicates the imaginary part).

Similarly, for the received signal, at any location (m+1,n) of the time/frequency network, we can write:

$$y_{m+1,n}^{(c)} = H_{m+1,n}^{(c)}(a_{m+1,n}^{(r)} + j a_{m+1,n}^{(i)}) \approx H_{m,n}^{(c)}(a_{m+1,n}^{(r)} + j a_{m+1,n}^{(i)})$$

Furthermore, assuming a central pilot at the location (m,n), a domain is defined in the preamble around this central pilot, denoted $\Omega_{P,Q}$, such that:

$\Omega_{P,Q} = \{(p,q), p=-P,K,P, q=-Q,K,Q\} - \{(0,0)\}$, where the location of the coordinates (0,0) corresponds to the location (m,n).

The assumption is then made that:

$$a_{m,n}^{(i)} \approx \sum_{p,q \in \Omega_{P,Q}} \Im\{\beta_{m_0+p,n_0+q}^{(m_0,n_0)}\} a_{m_0+p,n_0+q}^{(r)} \quad (8)$$

where $\beta_{p,q}$ is an expression whose real values depend on the functions g and f and on the phase term $\phi_{m,n}$ and whose main elements are presented in the appendix A which is an integral part of the present description and $\Im\{\beta_{m',n'}^{(m,n)}\}$ designates the imaginary part of $\beta_{m',n'}^{(m,n)}$.

The linear combination in this example is applied to $y_{m,n}^{(c)}$ and $y_{m+1,n}^{(c)}$ as follows so as to cancel or reduce the imaginary interference determined from the equation (8) affecting the central pilot located at the location (m,n):

$$t_1 y_{m,n} + t_2 y_{m+1,n}^{(c)} = H_{m,n}^{(c)}(t_1 a_{m,n}^{(r)} + t_2 a_{m+1,n}^{(r)} + j(t_1 a_{m,n}^{(i)} + t_2 q a_{m+1,n}^{(i)})), \quad (9)$$

with:
- $y_{m,n}^{(c)}$ the received (complex) signal at the location (m,n);
- $i_{m+1,n}^{(c)}$ the received (complex) signal at the location (m+1,n);
- $H_{m,n}^{(c)}$ the complex coefficient representing the transmission channel at the location (m,n), such that $H_{m,n}^{(c)} = H_{m+1,n}^{(c)}$;
- $a_{m,n}^{(r)}$ and $a_{m,n}^{(i)}$ are real values equal respectively to the real part and to the imaginary part of the value of a central pilot at the location (m,n);
- $a_{m+1,n}^{(r)}$ and $a_{m+1,n}^{(i)}$ are real values equal respectively to the real part and the imaginary part of the value of a central pilot at the location (m+1,n);
- $t_1$ and $t_2$ are real coefficients such that $t_1 a_{m,n}^{(i)} + t_2 a_{m+1,n}^{(i)} = 0$ Since the relationship of proportionality links the real values, at transmission, of the data elements of the end symbols framing the central pilots, it can be used to determine the real values $t_1$ and $t_2$ at reception so as to cancel or reduce the imaginary interference affecting said central pilots.

We consider for example a particular case in which the values of $t_1$ and $t_2$ are such that $t_1 = t_2 = 1$ with a phase $$\phi_{m,n} = \frac{\pi}{2}(n + m + 2mn).$$

The equation (9) can then be written as follows:

$$y_{m,n}^{(c)} + y_{m+1,n}^{(c)} = H_{m,n}^{(c)}(a_{m,n}^{(r)} + a_{m+1,n}^{(r)}) \quad (9\text{bis})$$

The real values $a_{m,n}^{(r)}$ and $a_{m+1,n}^{(r)}$ being known, the result thereof is that the estimation of the channel is obtained by:

$$H_{m,n}^{(c)} = \frac{y_{m,n}^{(c)} + y_{m+1,n}^{(c)}}{a_{m,n}^{(r)} + a_{m+1,n}^{(r)}}$$

In this particular case, the estimation of the channel is then obtained by the addition of the signals of the frequencies m and m+1 for the central pilots at the locations (m,n) and (m+1,n).

In a second example, we consider a channel that is roughly non-variant in time at the locations (m,n) and (m, n+1) and can be modelled by a complex coefficient by sub-carrier $H_{m,n}$, where m is the index of the sub-carrier and n is the index of a central symbol, and we then have:

$$H_{m,n}^{(c)} \approx H_{m,n+1}^{(c)}$$

The received signal, at any location (m,n) of the time/frequency network, can be interpreted as the result of the product of a complex channel multiplied by a complex value, i.e.:

$y_{m,n}^{(c)} = H_{m,n}^{(c)} a_{m,n}^{(c)} = H_{m,n}^{(c)}(a_{m,n}^{(r)} + ja_{m,n}^{(i)})$, where $a_{m,n}^{(r)}$ and $a_{m,n}^{(i)}$ are real values (the exponent (r) indicating the real part of a complex value, and the exponent (i) indicating the imaginary part.

Similarly, for the received signal, at any location (m, n+1) of the time/frequency network, we can write:

$y_{m,n+1}^{(c)} = H_{m,n+1}^{(c)}(a_{m,n+1}^{(r)} + ja_{m,n+1}^{(i)}) \approx H_{m,n}^{(c)}(a_{m,n+1}^{(r)} + ja_{m,n+1}^{(i)})$ In this case, the linear combination is applied to $y_{m,n}^{(c)}$ and $y_{m,n+1}^{(c)}$ as follows so as to cancel or reduce the imaginary interference affecting the central pilot located at the location (m,n):

$$t_1 y_{m,n}^{(c)} + t_2 y_{m,n+1}^{(c)} = H_{m,n}^{(c)}(t_1 a_{m,n}^{(r)} + t_2 a_{m,n+1}^{(r)} + j(t_1 a_{m,n}^{(i)} + t_2 a_{m,n+1}^{(i)})) \quad (10)$$

with:
$y_{m,n}^{(c)}$ the received (complex) signal at the location (m,n);
$y_{m,n+1}^{(c)}$ the received (complex) signal at the location (m,n+1);
$H_{m,n}^{(c)}$ the complex coefficient representing the transmission channel at the location (m,n), such that $H_{m,n}^{(c)} \approx H_{m,n+1}^{(c)}$;
$a_{m,n}^{(r)}$ and $a_{m,n}^{(i)}$ being the real values equal respectively to the real part and to the imaginary part of the value of a central pilot at the location (m,n)
$a_{m,n+1}^{(r)}$ and $a_{m,n+1}^{(i)}$ being the real values equal respectively to the real part and to the imaginary part of the value of a central pilot at the location (m,n+1);
$t_1$ and $t_2$ being coefficients such that $t_1 a_{m,n}^{(i)} + t_2 a_{m,n+1}^{(i)} = 0$.

Since the relationship of proportionality links the values of the data elements of the end symbols framing the central pilots when sending, it enables the real values $t_1$ and $t_2$ at reception to be determined so as to cancel or reduce the imaginary interference affecting said central pilots.

We consider for example a particular case in which the values of $t_1$ and $t_2$ are such that $t_1 = t_2 = 1$ with a phase $$\phi_{m,n} = \frac{\pi}{2}(n+m).$$

The equation (10) can then be written as follows:

$$y_{m,n}^{(c)} + y_{m,n+1}^{(c)} = H_{m,n}^{(c)}(a_{m,n}^{(r)} + a_{m,n+1}^{(r)}) \quad (10bis)$$

The real values $a_{m,n}^{(r)}$ and $a_{m,n+1}^{(r)}$ being known, the result thereof is that the estimation of the channel is obtained by:

$$H_{m,n}^{(c)} = \frac{y_{m,n}^{(c)} + y_{m,n+1}^{(c)}}{a_{m,n}^{(r)} + a_{m,n+1}^{(r)}}$$

The estimation of the channel is then obtained by adding the time-consecutive signals of a same frequency m for the central symbols located at the locations n and n+1.

Figure 4A:
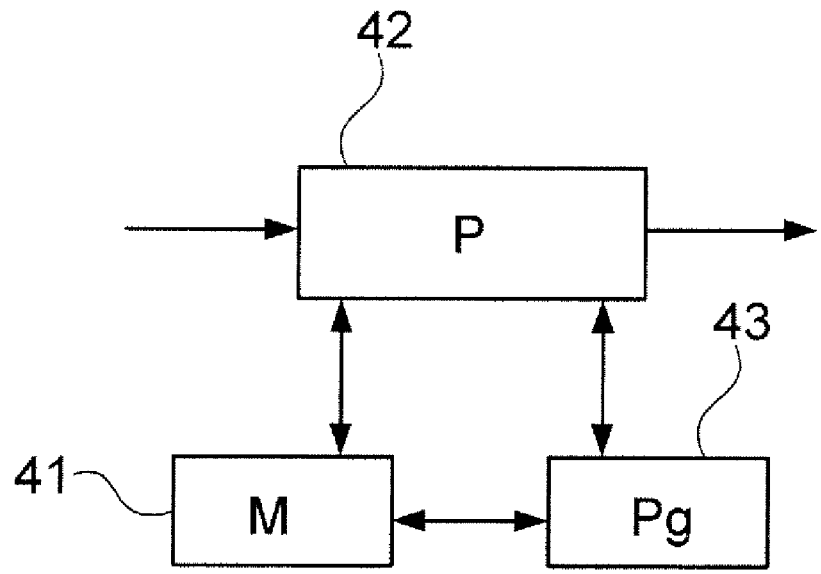
FIGS. 4A and 4B respectively present the structure of a sending device and a receiving device according to one embodiment of the invention.
Figure 4B:
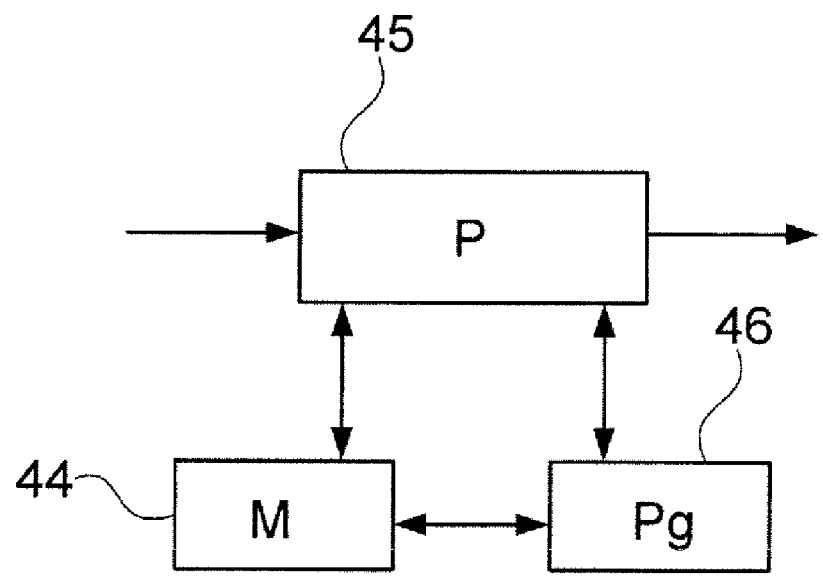

Referring now to FIGS. 4A and 4B, we present the simplified structures of a sending and receiving device according to the particular embodiment described here above.

As illustrated in FIG. 4A, a sending device of this kind comprises a memory 41, a processing unit 42 equipped for example with a microprocessor μP and driven by the computer program 43 implementing the sending method according to an embodiment of the invention.

At initialization, the code instructions of the computer program 43 are loaded for example into a RAM and then executed by the processor of the processing unit 42. At input, the processing unit 42 receives data to be transmitted in the form of informative data elements. The microprocessor of the processing unit 42 implements the steps of the sending method described here above so as to build a multicarrier signal comprising at least one preamble formed by at least three consecutive symbols, comprising at least two end symbols framing at least one central symbol formed by pilots, and designed to enable an estimation of said transmission channel. In particular, said end symbols carry, on at least some of their carriers neighboring a central pilot, data elements that are organized in groups of elements and whose real values in sending mode are linked by a relationship of proportionality enabling the reduction or cancellation, at reception, of an interference affecting said central pilot.

To this end, the sending device comprises means for the insertion, into the multicarrier signal, of at least one preamble formed by at least three consecutive symbols, comprising at least two end symbols framing at least one central symbol formed by pilots. These means are driven by the microprocessor of the processor unit 42.

The processing unit 42 outputs the above-mentioned multicarrier signal.

A receiving device illustrated in FIG. 4B comprises a memory 44, a processing unit 45 equipped for example with a microprocessor μP and driven by the computer program 46 implementing the receiving method according to an embodiment of the invention.

At initialization, the code instructions of the computer program 46 are loaded for example into a RAM and then executed by the processor of the processing unit 45. At input, the processing unit 45 receives the received multicarrier signal y(t). The microprocessor of the processing unit 45 implements the steps of the receiving method described here, according to the instructions of the computer program 46, to estimate the transmission channel and decode the data received. To this end, the receiving device comprises, for at least one central pilot, taking account of a relationship of proportionality linking the real values carried by each element of said group of elements and means for estimating said transmission channel, taking account of the result of said cancellation or reduction step. These means are driven by the microprocessor of the processing unit 55.

2. Appendix A
Computation of the Constants $\beta_{m_0+p,n_0+q}^{(m_0,n_0)}$ Related to the Base Modulation Functions and to the Phase Here below we present a method for computing the real constants $\beta_{m_0+p,n_0+q}^{(m_0,n_0)}$ such that:

$$\hat{a}_{m_0,n_0}^{(i)} \approx \sum_{p,q \in \Omega_{P,Q}} \Im\{\beta_{m_0+p,n_0+q}^{(m_0,n_0)}\} a_{m_0+p,n_0+q}^{(r)} \tag{11}$$

where $\Im\{\beta_{m',n'}^{(m,n)}\}$ designates the imaginary part of $\beta_{m',n'}^{(m,n)}$.

It may be recalled first of all that the multicarrier signal sent can be written in the form:

$$s(t) = \sum_{n} \sum_{m=0}^{M-1} \underbrace{a_{m,n} g(t-n\tau_0) e^{j2\pi m v_0 t} e^{j\phi_{m,n}}}_{g_{m,n}(t)} \tag{12}$$

If it is also assumed that the transmission channel is perfect, in taking it for example to be equal to (1), at least locally, the estimate of the transmitted coefficients is given by:

$$\hat{a}_{m,n}^{(c)} = \sum_{n',m'} \left[\int f_{m,n}^*(t) g_{m',n'}(t) dt\right] a_{m',n'} \tag{13}$$

Assuming:

$$\beta_{m',n'}^{(m,n)} = \int f_{m,n}^*(t) g_{m',n'}(t) dt \tag{14}$$

we obtain, for the biorthogonal functions f and g, $\Re\{\hat{a}_{m,n}^{(c)}\} = a_{m,n}$, giving:

$$\hat{a}_{m,n}^{(c)} = \hat{a}_{m,n}^{(r)} + j\hat{a}_{m,n}^{(i)} \tag{15}$$

$$= a_{m,n} + j\Im\left\{\sum_{n',m'} \beta_{m',n'}^{(m,n)} a_{m',n'}\right\}$$

$$= a_{m,n} + j\sum_{n',m'} \Im\{\beta_{m',n'}^{(m,n)}\} a_{m',n'}$$

There therefore remains an interference term which can be evaluated for any pilot ($a_{m_0,n_0}$) in a neighborhood P×Q in evaluating $\beta_{m',n'}$.

It is also noted that:

$$\hat{a}_{m,n}^{(i)} = \sum_{n',m'} \Im\{\beta_{m',n'}^{(m,n)}\} a_{m',n'}. \tag{16}$$

Developing the expression of the base modulation functions and demodulation functions, we obtain:

$$\beta_{m',n'}^{(m,n)} = e^{j(\phi_{m',n'} - \phi_{m,n})} \int f^*(t-n\tau_0) g(t-n'\tau_0) e^{j2\pi(m'-m)v_0 t} dt \tag{17}$$

In a neighborhood P>Q of ($m_0,n_0$), this equation can be rewritten in taking $m=m_0$, $n=n_0$, $m'=m_0+p$ and $n'=n_0+q$, giving:

$$\beta_{m_0+p,n_0+q}^{(m_0,n_0)} = e^{j(\phi_{m_0+p,n_0+q} - \phi_{m_0,n_0})} \int f^*(t-n_0\tau_0) g(t-(n_0+p)\tau_0) e^{j2\pi p v_0 t} dt \tag{18}$$

$$\beta_{m_0 p,n_0+q}^{(m_0,n_0)} = (-1)^{n_0 p} e^{j\phi_{m_0 q}} \int f^*(t) g(t-p\tau_0) e^{j2\pi p v_0 t} dt \tag{19}$$

It is therefore noted that the coefficients β can be obtained from the cross ambiguity function of f and g in the biorthogonal case or quite simply from the ambiguity function of g in the orthogonal case.

For its numerical evaluation, f and g being obtained with finite-length filters, this computation is more precise if it is done directly in discrete form:

$$\beta_{m_0+p,n_0+q}^{(m_0,n_0)} = \tag{20}$$
$$(-1)^{n_0 p} e^{j(\phi_{m_0+p,n_0+q} - \phi_{m_0,n_0})} \sum_{k} f^*[k] g[k-qN] e^{j\frac{2\pi}{2N}p(k-\frac{D}{2})}$$

with $D=\alpha N-\gamma$ and $M=2N$.

For its implantation on the reception side of a trans-multiplexer, it is preferable to take account of the fact that these coefficients have to be applied in taking account of a delay of $\alpha$ samples.

Here below, we present two examples of the determining of the coefficients β, in the context of an OFDM/OQAM type modulation having a real and even-parity continuous prototype function.

1. Phase defined by $$\phi_{m,n} = \frac{\pi}{2}(n+m)$$

Assuming:

$$\phi_{m,n} = \frac{\pi}{2}(n+m), \tag{21}$$

the equation (22) becomes:

$$\beta_{m_0+p,n_0+q}^{(m_0,n_0)} = (-1)^{n_0 p} e^{j\frac{\pi}{2}(p+q)} \int g(t) g(t-q\tau_0) e^{j2\pi p v_0 t} dt. \tag{22}$$

We then introduce the ambiguity function of a function x with the notation used in the patent document WO 02/25884 mentioned here above:

$$A_x(\tau, v) = \int x\left(t+\frac{\tau}{2}\right) \cdot x^*\left(t-\frac{\tau}{2}\right) e^{-j2\pi vt} dt$$

In changing the variable $$t = t' + \frac{q\tau_0}{2}$$

in the equation (22), we obtain:

$$\beta_{m_0+p,n_0+q}^{(m_0,n_0)} = (-1)^{n_0 p} e^{j\frac{\pi}{2}(p+q)} \int g\left(t+\frac{q\tau_0}{2}\right) g\left(t-\frac{q\tau_0}{2}\right) e^{j2\pi p v_0 (t+\frac{q\tau_0}{2})} dt$$

It being known that $$v_0 \tau_0 = \frac{1}{2},$$

the following is then obtained:

$$\beta_{m_0+p,n_0+q}^{(m_0,n_0)} = -(-1)^{n_0 p} e^{j\frac{\pi}{2}((p+q)+pq)} A(q\tau_0, pv_0).$$

Given that in this precise case, the function A is real, it is then possible to verify that the coefficient $\beta_{p,q}$ is a pure imaginary value.

2. Phase defined by $$\phi_{m,n} = \frac{\pi}{2}(n+m) + \pi nm$$

In performing the same computation as here above assuming $$\phi_{m,n} = \frac{\pi}{2}(n+m) + \pi nm,$$

we obtain:

$$\beta_{m_0+p,n_0+q}^{(m_0,n_0)} = -(-1)^{m_0 q+pq} e^{j\frac{\pi}{2}((p+q)+pq)} A(q\tau_0, pv_0)$$

Although the present disclosure has been described with reference to one or more examples, workers skilled in the art will recognize that changes may be made in form and detail without departing from the scope of the disclosure and/or the appended claims.

The invention claimed is:

1. Method for receiving a received signal corresponding to a multicarrier signal sent by at least one sender device through a transmission channel,
    said multicarrier signal being formed by a temporal succession of symbols formed by a set of data elements comprising:
        informative data elements, and
        for at least certain of said symbols, reference data elements, called pilots, whose value and location at transmission are known to at least one receiver designed to make a reception of said multicarrier signal,
    each of said data elements modulating a carrier frequency of said signal, a carrier frequency modulated by one of said data elements being called a carrier, wherein, at least one preamble formed by at least three consecutive symbols and designed to enable an estimation of said transmission channel being inserted into said multicarrier signal, said preamble symbols comprise at least two end symbols framing at least one central symbol formed by pilots, called central pilots, such that said end symbols carry, on at least some of their carriers neighbouring a central pilot, data elements organised into at least one group of elements, the data elements of at least one group of elements being informative data elements,
    said reception method comprises, for at least one central pilot:
        a step of cancelling or reducing an interference affecting said central pilot, taking account of a relationship of proportionality linking real values carried by each element of said group of elements;
        a step of estimating said transmission channel, taking account of the result of said cancellation or reduction step.

2. Method for receiving according to claim 1, wherein, said transmission channel being roughly constant on at least two consecutive frequencies demarcating a region of interest and said step of cancellation or reduction implements a linear combination in frequency of said central pilots located in said region of interest.

3. Method for receiving according to claim 1, wherein, said transmission channel being roughly constant on at least two consecutive instants forming a region of interest, and said preamble comprising at least two central symbols, said step of cancellation or reduction of interference affecting said central pilots implements a linear combination in time of said central pilots located in said region of interest.

4. Device for receiving of a received signal corresponding to a multicarrier signal sent out by at least one sender device through a transmission channel,
    said multicarrier signal being formed by a temporal succession of symbols formed by a set of data elements comprising:
        informative data elements, and
        for at least certain of said symbols, reference data elements, called pilots, whose value and location at transmission are known to at least one receiver designed to make a reception of said multicarrier signal,
    each of said data elements modulating a carrier frequency of said signal, a carrier frequency modulated by one of said data elements being called a carrier, wherein, at least one preamble formed by at least three consecutive symbols and designed to enable an estimation of said transmission channel being inserted into said multicarrier signal, said preamble symbols comprise at least two end symbols framing at least one central symbol formed by pilots, called central pilots, such that said end symbols carry, on at least some of their carriers neighbouring a central pilot, data elements organised into at least one group of elements, the data elements of at least one group of elements being informative data elements, and
    wherein said device for receiving comprises, for at least one central pilot:
        means for cancelling or reducing an interference affecting said central pilot, taking account of a relationship of proportionality linking the real values carried by each element of said group of elements;
        means for estimating said transmission channel, taking account of the result of said cancellation or reduction step.

5. A non-transitory computer-readable medium comprising a computer program product recorded thereon and executable by a processor, wherein the product comprises program code instructions for implementing a method for receiving a received signal corresponding to a multicarrier signal sent by at least one sender device through a transmission channel, said multicarrier signal being formed by a temporal succession of symbols formed by a set of data elements comprising:
    informative data elements, and
        for at least certain of said symbols, reference data elements, called pilots, whose value and location at transmission are known to at least one receiver designed to make a reception of said multicarrier signal,
    each of said data elements modulating a carrier frequency of said signal, a carrier frequency modulated by one of said data elements being called a carrier, wherein, at least one preamble formed by at least three consecutive symbols and designed to enable an estimation of said transmission channel being inserted into said multicarrier signal, said preamble symbols comprise at least two end symbols framing at least one central symbol formed by pilots, called central pilots, such that said end symbols carry, on at least some of their carriers neighbouring a central pilot, data elements organised into at least one group of elements, the data elements of at least one group of elements being informative data elements,
    said reception method comprises, for at least one central pilot:
        a step of cancelling or reducing an interference affecting said central pilot, taking account of a relationship of proportionality linking real values carried by each element of said group of elements; and
        a step of estimating said transmission channel, taking account of the result of said cancellation or reduction step.

6. Method for sending a multicarrier signal, intended for transmission via a transmission channel, formed by a temporal succession of symbols formed by a set of real-value data elements comprising:
    informative data elements, and
    for at least certain of said symbols, reference data elements called pilots whose value and location at transmission are known to at least one receiver designed to make a reception of said multicarrier signal,
    each of said data elements modulating a carrier frequency of said signal, a carrier frequency modulated by one of said data elements being called a carrier,
    wherein said method comprises inserting into said multicarrier signal at least one preamble formed by at least three consecutive symbols, said preamble symbols comprising at least two end symbols framing at least one central symbol formed by pilots, called central pilots,
    such that said end symbols carry, on at least some of their carriers neighbouring a central pilot, data elements organised into at least one group of elements, the values between each element of a group of elements being linked by a relationship of proportionality, making it possible to cancel or reduce, at reception, an interference affecting said central pilot, the data elements of at least one group of elements being informative data elements,
    so that said preamble makes it possible to determine an estimation of said transmission channel, and
    wherein the method further comprises transmitting the multicarrier signal by the sender.

7. The method according to claim 6, wherein said data elements of at least one group of elements are pilots.

8. The method according to claim 6, wherein said groups each comprise four informative data elements, each data element of a same group of elements bearing an identical value in terms of absolute value.

9. Device for sending a multicarrier signal, intended for transmission via a transmission channel, formed by a temporal succession of symbols formed by a set of real-value data elements comprising:
    informative data elements, and
    for at least certain of said symbols, reference data elements called pilots whose value and location at transmission are known to at least one receiver designed to make a reception of said multicarrier signal,
    each of said data elements modulating a carrier frequency of said signal, a carrier frequency modulated by one of said data elements being called a carrier,
    wherein said sending device comprises means for inserting into said multicarrier signal of at least one preamble formed by at least three consecutive symbols, said preamble symbols comprising at least two end symbols framing at least one central symbol formed by pilots, called central pilots, such that said end symbols carry, on at least some of their carriers neighbouring a central pilot, data elements organised in at least one group of elements, the values between each element of a group of elements being linked by a relationship of proportionality, making it possible to cancel or reduce, at reception, an interference affecting said central pilot, the data elements of at least one group of elements being informative data elements,
    so that said preamble makes it possible to determine an estimation of said transmission channel.

10. A non-transitory computer-readable medium comprising a computer program product recorded thereon and executable by a processor comprising program code instructions for implementing a method of sending a multicarrier signal, intended for transmission via a transmission channel, formed by a temporal succession of symbols formed by a set of real-value data elements comprising:
    informative data elements, and
    for at least certain of said symbols, reference data elements called pilots whose value and location at transmission are known to at least one receiver designed to make a reception of said multicarrier signal,
    each of said data elements modulating a carrier frequency of said signal, a carrier frequency modulated by one of said data elements being called a carrier,
    wherein said method comprises:
    inserting into said multicarrier signal at least one preamble formed by at least three consecutive symbols, said preamble symbols comprising at least two end symbols framing at least one central symbol formed by pilots, called central pilots,
        such that said end symbols carry, on at least some of their carriers neighbouring a central pilot, data elements organised into at least one group of elements, the values between each element of a group of elements being linked by a relationship of proportionality, making it possible to cancel or reduce, at reception, an interference affecting said central pilot, the data elements of at least one group of elements being informative data elements,
        so that said preamble makes it possible to determine an estimation of said transmission channel, and
    transmitting the multicarrier signal by the sender.

* * * * *

UNITED STATES PATENT AND TRADEMARK OFFICE
CERTIFICATE OF CORRECTION

PATENT NO. : 8,401,109 B2
APPLICATION NO. : 12/373500
DATED : March 19, 2013
INVENTOR(S) : Lele et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1104 days.

Signed and Sealed this
First Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,401,109 B2  
APPLICATION NO. : 12/373500  
DATED : March 19, 2013  
INVENTOR(S) : Chrislin Lele et al.

Page 1 of 1

It is certified that error appears in the above-identified patent and that said Letters Patent is hereby corrected as shown below:

In the Specification

In column 14, equation 9, delete:

" $t_1 y_{m,n} + t_2 y_{m+1,n}^{(c)} = H_{m,n}^{(c)} (t_1 a_{m,n}^{(r)} + t_2 a_{m+1,n}^{(r)} + j (t_1 a_{m,n}^{(i)} + t_2 q a_{m+1,n}^{(i)}))$, "

and insert therefor:

-- $t_1 y_{m,n}^{(c)} + t_2 y_{m+1,n}^{(c)} = H_{m,n}^{(c)} \left( t_1 a_{m,n}^{(r)} + t_2 a_{m+1,n}^{(r)} + j \left( t_1 a_{m,n}^{(i)} + t_2 a_{m+1,n}^{(i)} \right) \right)$ --.

In Column 18, equation 19, delete:

" $\beta_{m_0 p, n_0 + q}^{(m_0, n_0)} = (-1)^{n_0 p} e^{j(\phi m q o)} \int f^*(t) g(t - p\tau_0) e^{j 2\pi p v_0 t} dt$ "

and insert therefor:

-- $\beta_{m_0 + p, n_0 + q}^{(m_0, n_0)} = (-1)^{n_0 p} e^{j(\phi_{m_0+p, n_0+q} - \phi_{m_0, n_0})} \int f^*(t) g(t - p\tau_0) e^{j 2\pi p v_0 t} dt$ --.

Signed and Sealed this  
Twenty-fourth Day of May, 2016

Michelle K. Lee  
*Director of the United States Patent and Trademark Office*